United States Patent
Neuerburg

[19]

[11] Patent Number: 5,966,913
[45] Date of Patent: Oct. 19, 1999

[54] CONDITIONING DEVICE, CONDITIONING MACHINE AND MOWER-CONDITIONER COMPRISING SUCH A DEVICE

[75] Inventor: Horst Neuerburg, Saverne, France

[73] Assignee: Kuhn S.A., Saverne Cedex, France

[21] Appl. No.: 09/122,753

[22] Filed: Jul. 27, 1998

[30] Foreign Application Priority Data

Sep. 2, 1997 [FR] France .................................. 97 11041

[51] Int. Cl.$^6$ .................................................. A01D 61/00
[52] U.S. Cl. .................................... 56/16.4 R; 56/16.4 A
[58] Field of Search ........................... 56/16.4 R, 16.4 A, 56/16.4 B, 6, 192, 193

[56] References Cited

U.S. PATENT DOCUMENTS

| | | | |
|---|---|---|---|
| 3,699,755 | 10/1972 | Hauser | 56/16.4 R |
| 4,343,138 | 8/1982 | Neuerburg . | |
| 4,426,828 | 1/1984 | Neuerburg . | |
| 4,443,998 | 4/1984 | Neuerburg . | |
| 4,452,034 | 6/1984 | Neuerburg . | |
| 4,499,712 | 2/1985 | Klinner | 56/16.4 R |
| 4,528,806 | 7/1985 | Klinner | 56/16.4 R |
| 4,539,798 | 9/1985 | Klinner | 56/16.4 R |
| 4,739,609 | 4/1988 | Meier et al. | 56/16.4 R |
| 4,799,352 | 1/1989 | Amstutz | 56/16.4 R |
| 4,809,488 | 3/1989 | Neuerburg et al. . | |
| 4,879,870 | 11/1989 | Neuerburg . | |
| 4,896,493 | 1/1990 | Neuerburg . | |
| 4,922,693 | 5/1990 | Neuerburg . | |
| 4,970,848 | 11/1990 | Neuerburg et al. . | |
| 4,999,981 | 3/1991 | Neuerburg . | |
| 5,241,809 | 9/1993 | Wolff et al. . | |
| 5,566,537 | 10/1996 | Kieffer et al. . | |
| 5,660,032 | 8/1997 | Neuerburg et al. . | |
| 5,724,794 | 3/1998 | Wolff . | |
| 5,727,371 | 3/1998 | Kieffer et al. . | |

FOREIGN PATENT DOCUMENTS

| | | | |
|---|---|---|---|
| 0 064 115 | 11/1982 | European Pat. Off. . | |
| 0 100 628 | 2/1984 | European Pat. Off. . | |
| 0 129 007 | 12/1984 | European Pat. Off. . | |
| 2 107 042 | 5/1972 | France . | |
| 2 428 384 | 1/1980 | France . | |
| 3446321 | 6/1986 | Germany . | |
| 8601-315-A | 12/1987 | Netherlands | 56/16.4 R |
| 2 020 155 | 11/1979 | United Kingdom . | |
| 2124876 | 2/1984 | United Kingdom | 56/16.4 R |
| 2140664 | 12/1984 | United Kingdom | 56/16.4 R |
| 2151893 | 7/1985 | United Kingdom | 56/16.4 R |
| 79/00863 | 11/1979 | WIPO | 56/16.4 R |
| 86/02521 | 5/1986 | WIPO | 56/16.4 R |

*Primary Examiner*—Thomas B. Will
*Assistant Examiner*—Arpad Fabian Kovacs
*Attorney, Agent, or Firm*—Oblon, Spivak, McClelland, Maier & Neustadt, P.C.

[57] ABSTRACT

A conditioning device for harvesting products includes a casing having an inlet and outlet section, a transport rotor, a deflector defining a passage channel, and at least one comb having teeth which enter the passage channel through a slit in the deflector. The comb is connected to the deflector so that it can be placed in at least two different positions with respect to the deflector. The deflector is also connected to the casing so as to be able to be placed in at least two different positions with respect to the transport rotor so as to alter the passage section of the passage channel. A conditioning machine and a mower conditioner also include the conditioning device described above.

12 Claims, 5 Drawing Sheets

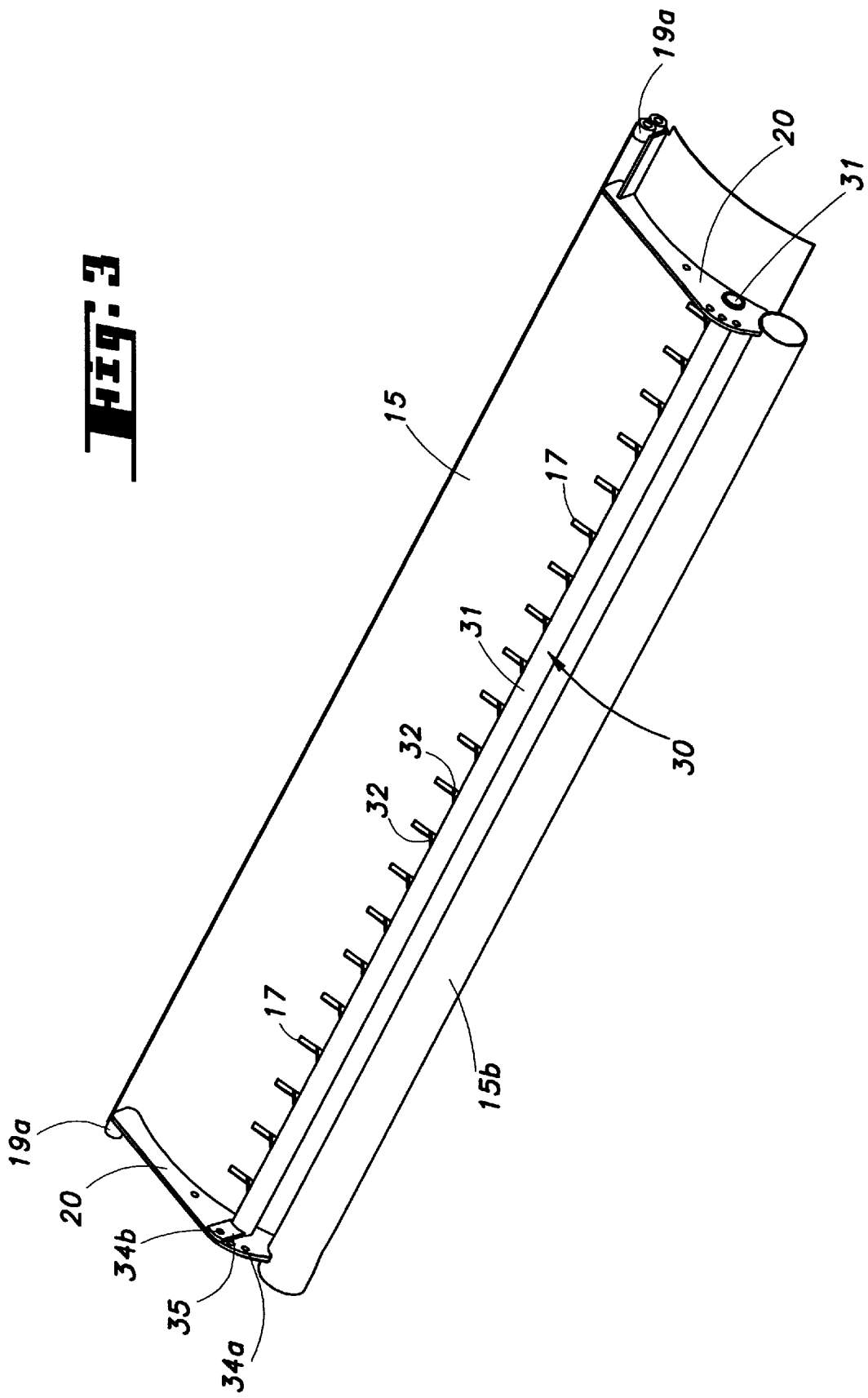

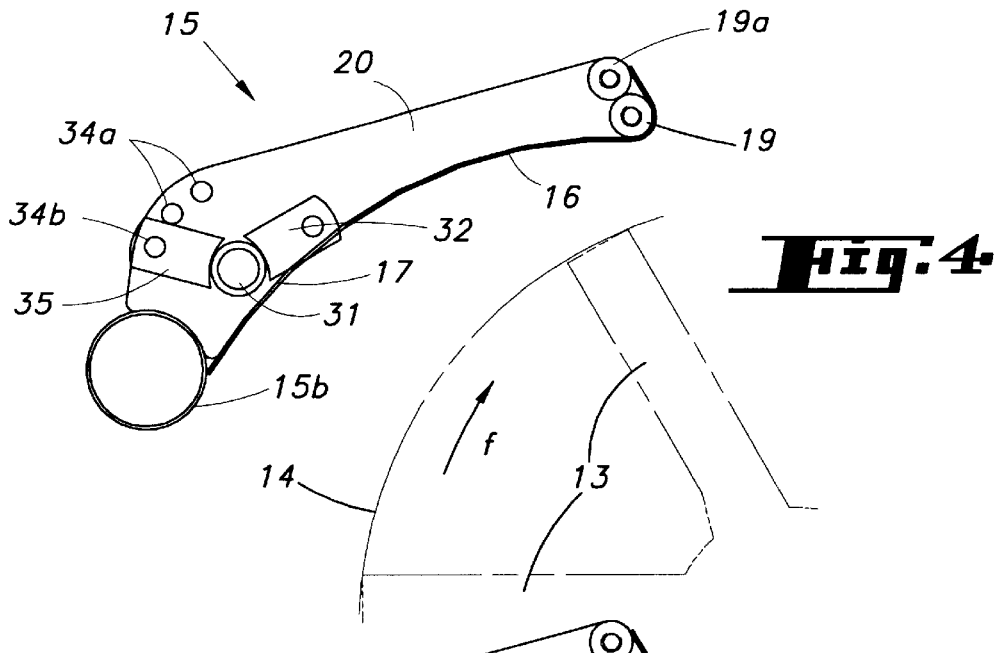
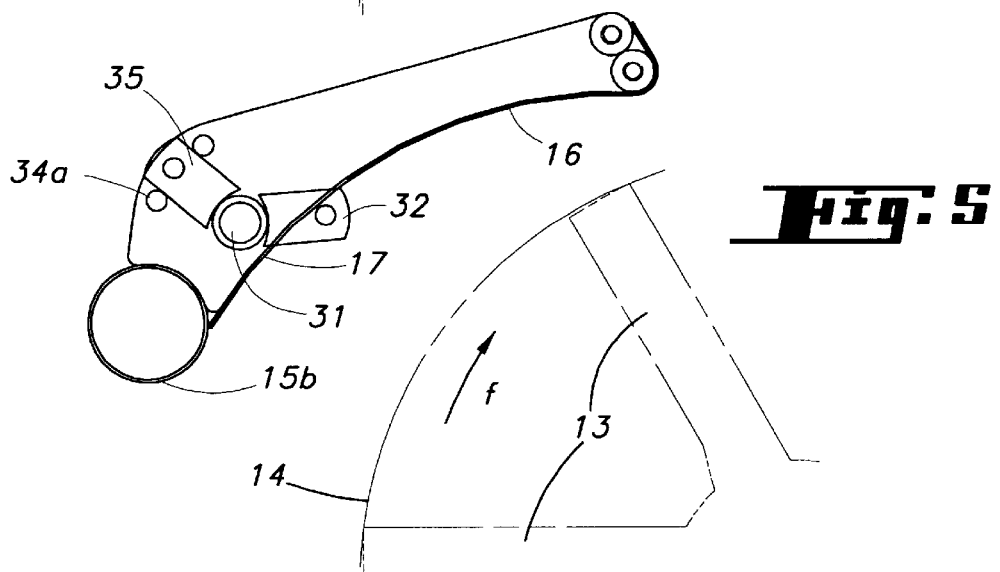
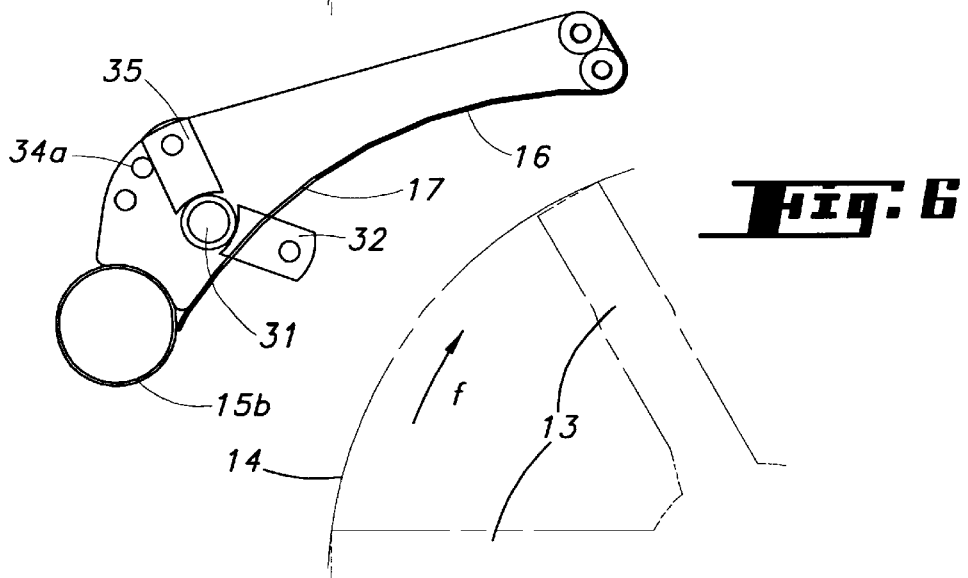

CONDITIONING DEVICE, CONDITIONING MACHINE AND MOWER-CONDITIONER COMPRISING SUCH A DEVICE

BACKGROUND OF THE INVENTION

1. Field of the Invention

The present invention relates to the general technical field of conditioning harvested products such as fodder intended, in particular, for animal feed. Conditioning is often beneficial to harvested products intended for drying or ensilage because treating said products to some extent encourages the water contained in them, and especially in their stalks, to evaporate. Accelerated drying may thus occur.

The present invention more particularly relates to a device for achieving such conditioning. This device is often advantageously associated with a mower to constitute a mower-conditioner.

2. Discussion of the Background

The production of a conditioning device for harvested products, comprising:

- a casing which has an inlet section and an outlet section for the products,
- a transport rotor provided with fingers and mounted in the casing on an approximately horizontal axis,
- a deflector arranged on the casing facing the transport rotor so as to define a passage channel for the products on the same side as the inlet section, said passage channel having a certain passage section,
- and a comb fitted outside the passage channel, said comb having teeth capable of entering the passage channel more or less deeply through at least one slit achieved in the deflector, is already known.

Thus, document FR-A-2 107 042 discloses a machine for conditioning harvested agricultural products, which machine is equipped with a casing and a transport rotor. The latter acts on cut products or fodder as it enters the casing. The machine described also comprises a deflector facing the transport rotor to define a passage channel for the products or fodder. The rotor is equipped with transport tools of the finger type, which fingers interact with a comb mounted on the casing and the teeth of which can enter the passage channel. The teeth thus penetrate more or less deeply between the surfaces swept by the fingers. Such a machine does not seem able to adapt to the increasing diversity of agricultural products or fodder and harvesting conditions. This diversity entails a greater number of possibilities for adjustment, which are not achieved with the machine described in the state of the art.

SUMMARY OF THE INVENTION

The object of the present invention is to overcome the drawbacks of the state of the art and to produce a conditioning device capable of adapting to any type of harvested product or fodder and any type of harvesting conditions in order to obtain optimum conditioning or treatment of said products.

Another object of the present invention is to simplify the construction of the conditioning device while at the same time maintaining many possibilities for adjustment and reducing to the minimum the number of parts needed for said adjustments.

The objectives that the present invention has set itself are achieved using a conditioning device wherein the comb is connected to the deflector so that it can be placed in at least two different positions with respect to said deflector which is itself connected to the casing so as to be able to be placed in at least two different positions with respect to the transport rotor so as to alter the passage section of the passage channel.

BRIEF DESCRIPTION OF THE DRAWINGS

Other features and advantages will emerge from reading the detailed description below, with reference to the appended drawings, given by way of nonlimiting examples, and in which:

FIG. 3 depicts a view in perspective of a deflector associated with a comb forming a subassembly of the conditioning device according to the invention, FIGS. 4, 5 and 6 depict various relative positions of the comb and of the deflector of a conditioning device in accordance with the invention.

DESCRIPTION OF THE PREFERRED EMBODIMENT

The present invention relates in particular to agricultural machines comprising a harvesting mechanism and a conditioning mechanism for agricultural products or for fodder. The machine described in detail is a mower-conditioner 1, but other machines, such as a conditioner without a mowing unit, would not be departing from the scope of the present invention.

Figure 1:
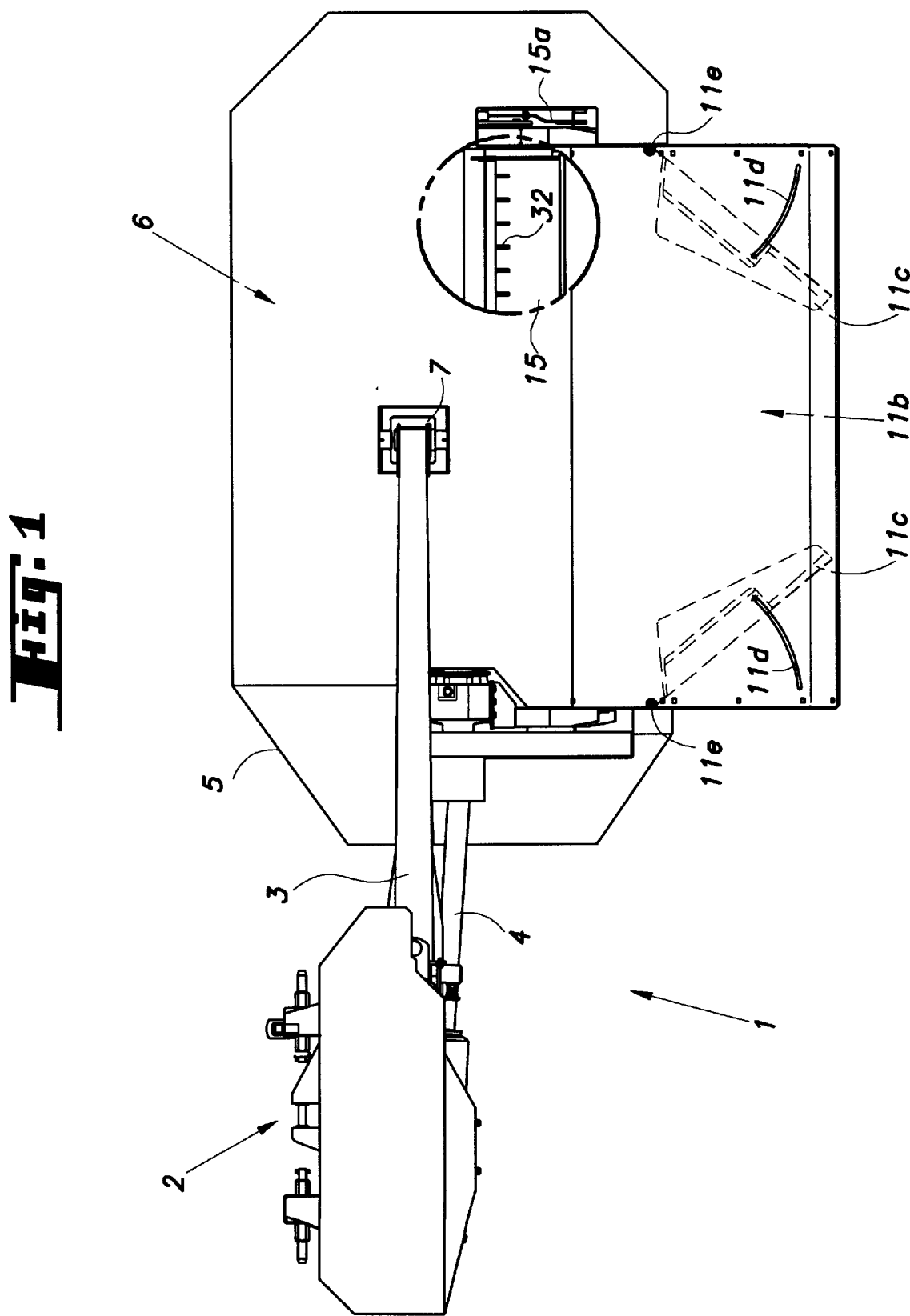
FIG. 1 depicts a view from above of a mower-conditioner comprising a conditioning device in accordance with the invention
Figure 2:
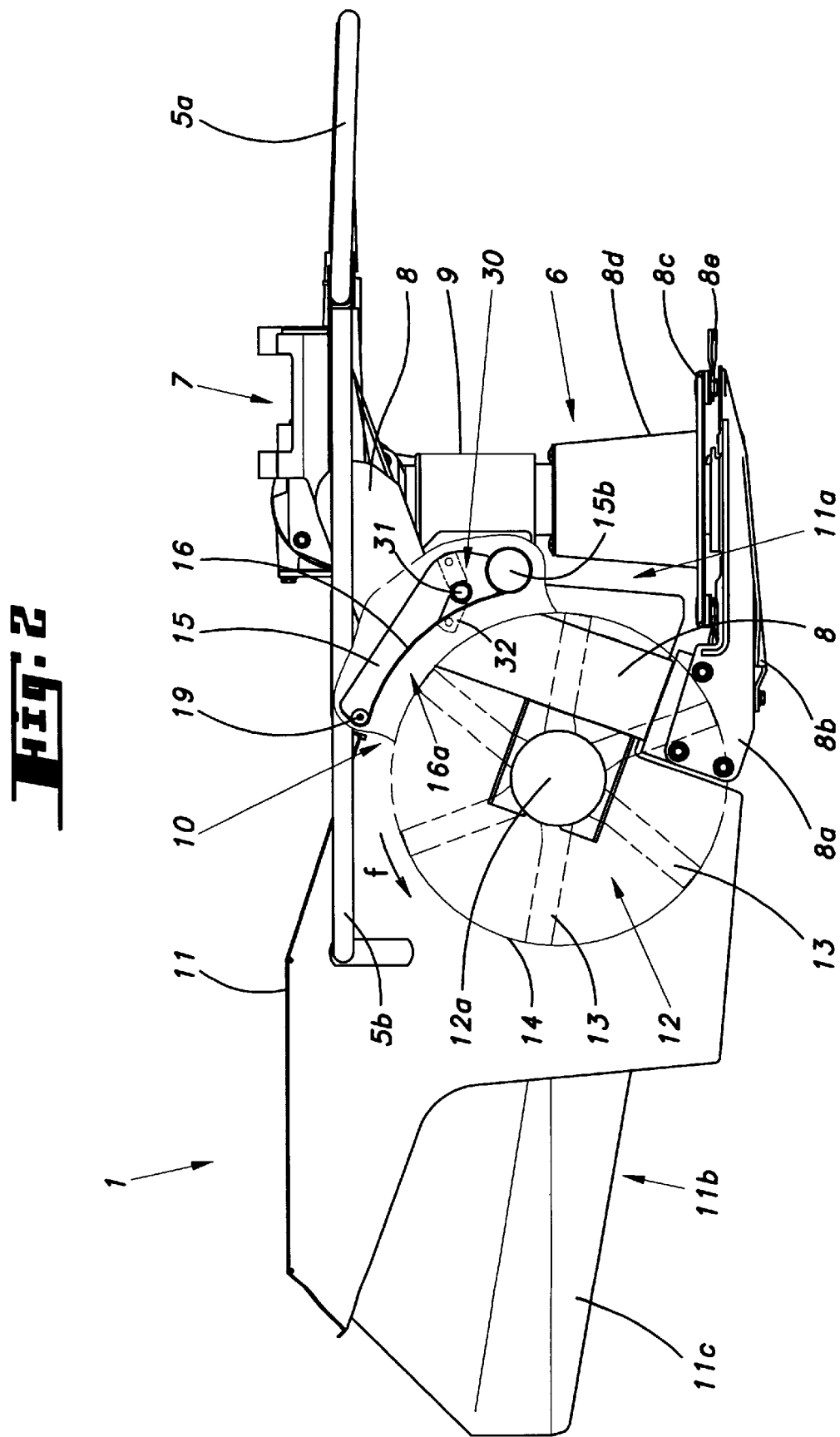
FIG. 2 depicts a side view with partial cutaway of the mower-conditioner depicted in FIG. 1.

The mower-conditioner 1 shown in a view from above in FIG. 1 comprises a hitch structure 2 for attaching to a tractor. The hitch structure 2 is connected by an articulated arm 3 and a drive shaft 4 to a harvesting mechanism. The latter is surrounded by a protective device 5 made from a frame 5b and a front guard 5a (FIG. 2 in particular). The frame 5b and the front guard 5a are advantageously covered with fabric in order to maintain within the protection device 5 any stones or other dangerous elements that may accidentally be contained in the fodder to be harvested and that may be thrown up.

In the embodiment depicted in the figures, the harvesting mechanism comprises, in particular, a cutting mechanism 6 (FIG. 2). This mechanism is connected to the articulated arm 3 by means of an articulation 7. The cutting mechanism 6, depicted in FIG. 2, consists, for example, of a carrying tube 8 supporting a cutter bar ending in a bar stiffener 8a under which there is mounted a sole 8b intended to slip along the ground. The cutter bar also comprises means allowing a set of disks 8c fitted with cutters or blades 8e to be rotated. Each disk 8c situated at the end of the cutter bar is advantageously provided with a windrowing cap 8d. The cutting mechanism 6 is driven, that is to say the disks 8c are rotated, by a transmission member 9 mounted on one of the disks 8c situated at one end of the cutting mechanism 6 and connected to the drive shaft 4 by any known means. It is the support tube 8 which is connected to the articulated arm 3 by means of the articulation 7.

FIG. 2 also shows the conditioning device 10 in accordance with the invention. The conditioning device 10 comprises a casing 11 fixed to the support tube 8. The conditioning device 10 is therefore associated with the cutting mechanism 6. The casing 11 has an inlet section 11a situated behind the cutting mechanism 6 and an outlet section 11b situated at the rear of the mower-conditioner 1. The outlet section 11b is advantageously provided with lateral deflectors 11c in order to produce a windrow of cut and conditioned product. The orientation of the lateral deflectors 11c can be changed thanks to the fact that they are mounted so they can pivot about a pivot 11e and a guide slot 11d which are depicted in FIG. 1.

The conditioning device 10 also comprises a transport rotor 12 intended, on the one hand, to carry along the cut products or fodder and, on the other hand, to condition said products or fodder. The transport rotor 12 consists of a shaft 12a mounted in the casing 11 on an approximately horizontal axis and rotated directly or indirectly by the drive shaft 4. The shaft 12a is also provided with fingers 13 which are mounted so that they can at least partially move, in order to extend radially outward under the effect of centrifugal force, defining a peripheral working path 14 when the transport rotor 12 rotates. The fingers 13 may have various shapes known to those skilled in the art. Mounting said fingers 13 on axes of pivoting allows them to retract at least partially should an obstacle or an abnormal amount of fodder enter the mower-conditioner 1.

The conditioning device 10 in accordance with the invention also comprises a deflector 15 arranged on the casing 11 facing the transport rotor 12 so as to define a passage channel 16a having a passage section for the products or fodder, on the same side as the inlet section 11a. An operating member 15a is also provided, for changing the position of the deflector 15.

The passage channel 16a is therefore located between an active surface 16 of the deflector 15 and the peripheral path 14 of the fingers 13. The deflector 15 also has at least one slit 17, the function of which will be described later.

The deflector 15 is preferably mounted on the casing 11 in such a way that it can be pivoted about a first axis of articulation 19 or 19a under the effect of actuation on the operating member 15a, thus changing the configuration and dimensions of the passage channel 16a.

Advantageously, two axes of articulation 19 and 19a, offset from one another, are located near one end of the deflector 15 so as to change the position of this end of the deflector 15 with respect to the transport rotor 12 when changing from a setup using the axis of articulation 19 to a setup using the other axis of articulation 19a or vice versa.

The deflector 15 is also shifted using the operating member 15a (FIG. 1). The user can thus pivot the active surface 16 about the axis of articulation 19 or 19a depending on the setup (FIG. 2).

The deflector 15, depicted also in FIG. 3, has a profiled shape at least partially surrounding the peripheral path 14. That part of the deflector 15 which has the active surface 16 is also reinforced by a connection with a cylindrical tube 15b and with two end plates 20 situated one at each end of said deflector 15. The end plates 20 advantageously extend as far as hollow end pieces which form the axes of articulation 19; 19a.

The end plates 20, the cylindrical tube 15b and the part forming the active surface 16 are assembled by any known means, and in particular by welding.

The conditioning device 10 in accordance with the invention also comprises a comb 30 articulated about an axis 31 situated outside of the passage channel 16a. By way of example, FIGS. 2 and 3, in particular, show such a comb 30 comprising teeth 32 capable of at least partially entering the passage channel 16a through one or more slits 17 in the deflector 15. FIG. 3 shows, by way of example, a deflector 15 equipped with a series of parallel slits 17, the shape of which noticeably complements the shape of the teeth 32.

The comb 30 is articulated opposite the slits 17 so as to close said slits 17, this being for each position of the teeth 32. The products or fodder thrown against the active surface 16 which has these slits 17 therefore does not enter said slits 17 and there is therefore no risk of it becoming caught therein.

The axis 31 of articulation of the comb 30 is mounted on the end plates 20 which are equipped with an appropriate opening for guiding the rotation of said axis 31. The end plates 20 preferably extend in a plane orthogonal to the active surface 16 and outside of the passage channel 16a.

The axis 31 also has a means for locking the comb 30 in a given position. This locking means consists, for example, of lugs 35 secured to the axis 31. Each lug 35 is situated near a corresponding one of the end plates 20 so as to be locked against said end plate 20. For this, said lug 35 and said end plate 20 respectively comprise drillings 34b and 34a through which a stud or any other element capable of locking the lug 35 against the end plate 20 can pass.

FIGS. 4 to 6 depict the deflector 15 with various positions of adjustment for the comb 30.

The lug 35 is angularly offset with respect to the teeth 32 thus allowing access to various positions of adjustment for the comb 30, said positions being located on the deflector 15 and therefore outside of the passage channel 16a.

FIG. 4 depicts the comb 30 with the teeth 32 projecting only a short way into the passage channel 16a. Such adjustment therefore makes the first of the drillings 34a of the end plate 20 coincide with the drilling 34b made in the lug 35.

FIGS. 5 and 6 correspond to the teeth 32 penetrating further into the passage channel 16a and therefore to greater conditioning of the products or fodder. The latter is carried along by the transport rotor 12 in the direction f represented in FIGS. 2 and 4 to 7.

In order to narrow the passage channel 16a toward the rear of the deflector 15, all that is required is for the latter to be mounted on the axis of articulation 19a (FIG. 3). The user can then actuate operating member 15a and bring the front of the deflector 15, in this case the cylindrical tube 15b closer to, or further away from, the periphery 14 of the fingers 13.

With the adjustment of the position of the teeth 32, the user therefore has many possibilities for adjustment. Each possibility corresponds either to a type of product or fodder or to a given degree of conditioning, or alternatively to specific harvesting conditions. Note that the more the dimensions (passage section) of the passage channel 16a are decreased, the more the speed at which the products or fodder are ejected from the conditioning device 10 is increased. This also makes windrowing easier.

According to an additional embodiment of the device in accordance with the invention, the teeth 32 can extend between the peripheral paths 14 of the fingers 13. The latter are, in this case, preferably made of a rigid or metallic material.

According to another embodiment of the device in accordance with the invention, the fingers 13 are made of a deformable or flexible plastic.

The articulation of the deflector 15 to the casing 11 may, as the case may be, be adapted so that said deflector 15 can adopt two, three or more positions with respect to the transport rotor 12.

The conditioning device 10 preferably comprises means for being able to shift the teeth 32 of the comb 30 into at least two positions and to hold said teeth 32 in said positions, one of which corresponds to teeth 32 extending almost entirely out of the passage channel 16a, and the other of which corresponds to teeth 32 projecting into the passage channel 16a, this being for each position of the deflector 15.

The conditioning device 10 in accordance with the invention therefore comprises means for shifting the teeth 32, for example between at least two positions, one corresponding to teeth 32 extending substantially outside the passage channel 16a, the other corresponding to teeth 32 projecting extensively inside the passage channel 16a.

The user of the conditioning device 10 therefore has a great many possibilities of adjustment available to him. Indeed, he has the possibility of choosing one of the axes of articulation 19 or 19a, of carrying out adjustment using the operating member 15a of orienting the teeth 32 of the comb 30 appropriately and possibly of selecting a given rotational speed for the transport rotor 12. Each adjustment may be maintained using appropriate holding or locking means.

Figure 7:
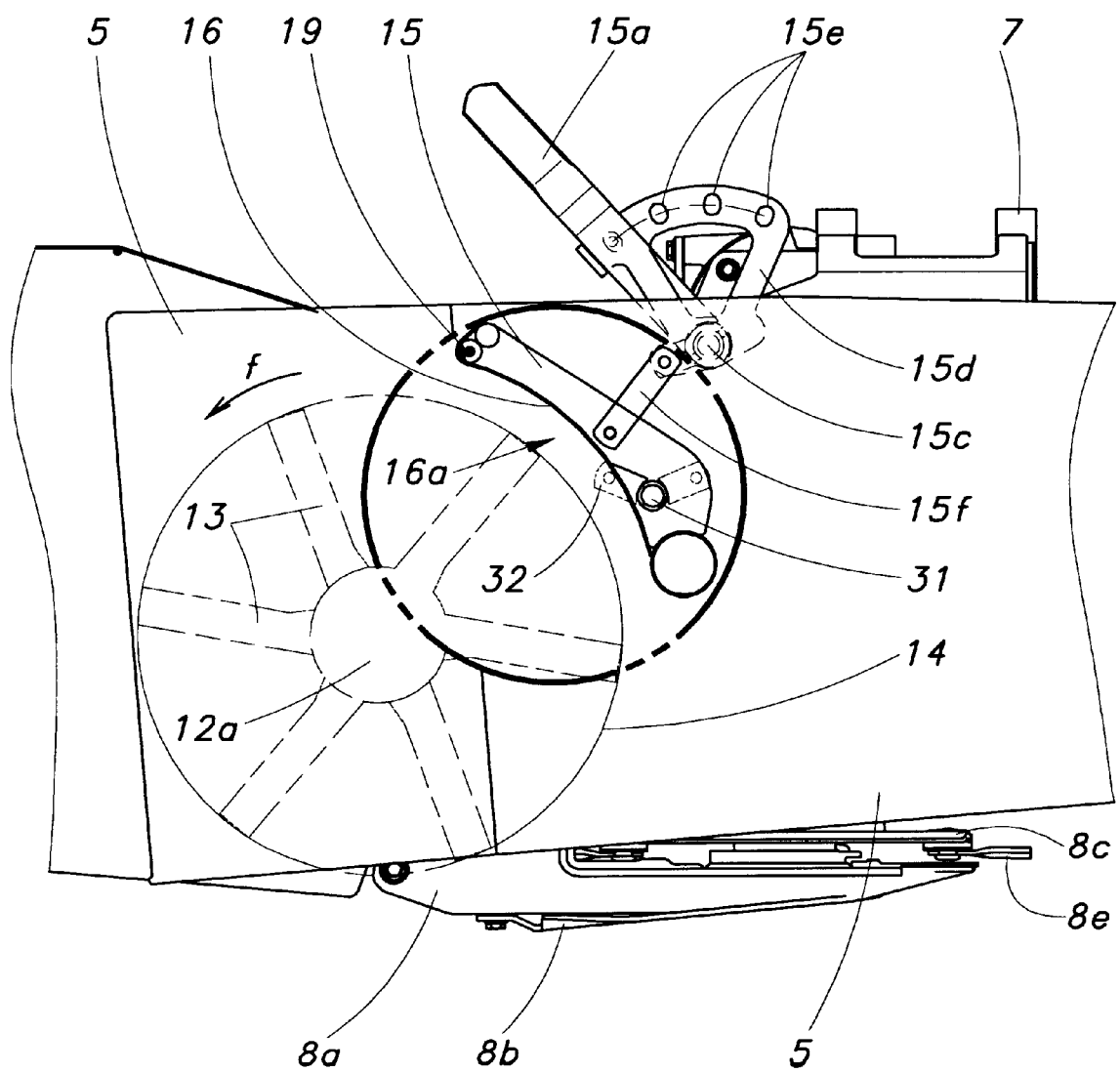
FIG. 7 depicts a half view of one embodiment of an operating and holding member of a conditioning device in accordance with the invention.

FIG. 7 depicts one example of a setup of the operating member 15a. The figure is partially cut away in order to show the mutual layout of the transport rotor 12, the deflector 15 and the operating member 15a.

The latter is mounted on the casing 11 by any known means and is used to shift the deflector 15 to suit. The operating member 15 is, for example, mounted on a spindle 15c close to a gaging and locking member 15d, which has holes 15e corresponding to the possible positions of said operating member 15a. The latter is also associated with an articulated rod 15f providing the connection between said operating member 15a and the deflector 15. The layout and setup of these various elements are within the competence of a person skilled in the art to obtain optimum pivoting or shifting of the deflector 15 by actuating the operating member 15a. Advantageously, the rod 15f is articulated to one end of the operating member 15a about an axis which is offset with respect to the axis 15c. Any known element of the crank or some other type may also be suitable for actuating the deflector 15.

The conditioning device in accordance with the invention has the advantage that a great many possibilities for adjustment have an unexpected and advantageous influence on the results of the conditioning operations.

The conditioning device is advantageously associated with the cutting mechanism 6 to form a mower-conditioner.

The device in accordance with the invention also finds an application in any agricultural machine designed for conditioning agricultural products or fodder.

Advantageously, the device described may comprise an elastic means, for example a spring, holding the deflector 15 in the chosen position and allowing said deflector 15 to pivot against the return force exerted by said elastic means. This makes it possible to avoid damage associated with an obstacle of the stone or some other type entering the passage channel 16a.

What is claimed as new and desired to be secured by Letters Patent of the United State is:

1. A conditioning device for harvested products comprising:

a casing which has an inlet section and an outlet section for the products, a transport rotor provided with fingers and mounted in the casing on an approximately horizontal axis, a deflector arranged on the casing facing the transport rotor so as to define a passage channel for the products on the same side as the inlet section, said passage channel having a certain passage section, at least one comb fitted outside the passage channel, said comb having teeth capable of entering the passage channel more or less deeply through at least one slit in the deflector, wherein the comb is connected to the deflector so that it can be placed in at least two different positions with respect to said deflector which is itself adjustably connected to the casing so as to be able to be placed in at least two different positions with respect to the transport rotor so as to alter the passage section of the passage channel.

2. The conditioning device as claimed in claim 1, wherein an operating and locking member is provided, allowing the deflector to be placed in its various positions and held in these positions.

3. The conditioning device as claimed in claim 1, wherein the deflector is articulated to the casing in such a way that it can be pivoted about an axis of articulation approximately parallel to the axis of the transport rotor.

4. The conditioning device as claimed in claim 3, wherein at least two axes of articulation and offset from one another are located near one end of the deflector so as to be able to change the position of the end of said deflector with respect to the transport rotor when the axis of articulation is changed.

5. The conditioning device as claimed in claim 1, wherein the comb is articulated to the deflector in such a way that it can be pivoted about an axis of articulation approximately parallel to the axis of the transport rotor.

6. The conditioning device as claimed in claim 1, which comprises means so as to be able to shift the teeth of the comb into at least two positions, and to hold said teeth in the positions, one of which corresponds to teeth extending almost entirely outside of the passage channel, and the other of which corresponds to teeth projecting into the passage channel, this being for each position of the deflector.

7. The conditioning device as claimed in claim 1, wherein the deflector has a series of parallel slits, the shape of which noticeably complements the shape of the teeth of the comb.

8. The conditioning device as claimed in claim 7, wherein the comb is mounted opposite the slits in such a way as to substantially close said slits, this being for each position of its teeth.

9. The conditioning device as claimed in claim 1, which comprises an elastic means holding the deflector in its various positions, said deflector being able to move against the return force exerted by said elastic means.

10. The conditioning device as claimed in claim 1, wherein the fingers are mounted at least partially movable on the transport rotor so as to extend radially outward under the effect of centrifugal force, defining a peripheral path when said transport rotor rotates.

11. A machine for conditioning harvested products, comprising a conditioning device as claimed in claim 1.

12. A mower-conditioner comprising a cutting mechanism intended to cut harvest products and a device as claimed in claim 1 for conditioning the cut harvest products.

* * * * *